United States Patent
Kikuchi et al.

(10) Patent No.: US 6,269,070 B1
(45) Date of Patent: Jul. 31, 2001

(54) OPTICAL DISC HAVING SPECIFIED TRACK PITCH, PUSH-PULL SIGNAL, AND CROSS-TRACK SIGNAL

(75) Inventors: Minoru Kikuchi; Yoshihiro Akimoto; Fuminori Takase; Masaki Kagawa; Nobuhiro Saito, all of Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/135,793

(22) Filed: Aug. 18, 1998

(30) Foreign Application Priority Data

Aug. 18, 1997 (JP) .................................................. 9-221817

(51) Int. Cl.⁷ ...................................................... G11B 7/24
(52) U.S. Cl. ............................................................ 369/275.4
(58) Field of Search .............................. 369/275.1, 275.3, 369/275.4, 275.2, 44.13, 112

(56) References Cited

U.S. PATENT DOCUMENTS

| | | | |
|---|---|---|---|
| 5,883,879 | * | 3/1999 | Fukuoka et al. .................. 369/275.4 |
| 5,946,287 | * | 8/1999 | Nakayama et al. ............... 369/275.4 |
| 5,959,963 | * | 9/1999 | Sugaya et al. .................... 369/275.4 |

FOREIGN PATENT DOCUMENTS

| | | |
|---|---|---|
| 0 320 291 A2 | 6/1989 | (EP) . |
| 0 527 602 A2 | 2/1993 | (EP) . |
| 0 626 679 A2 | 11/1994 | (EP) . |
| 0 674 309 A1 | 9/1995 | (EP) . |
| 0 751 505 A2 | 1/1997 | (EP) . |

\* cited by examiner

*Primary Examiner*—Nabil Hindi
(74) *Attorney, Agent, or Firm*—Sonnenschein, Nath & Rosenthal

(57) ABSTRACT

The present invention provides a rewritable optical disc which is compatible with a DVD-ROM reproduction apparatus and employs the groove recording method. The optical disc has a recording layer having a land 10 and a groove 9 onto/from which an information signal is recorded and reproduced with a light of a predetermined wavelength, wherein if it is assumed that the groove has a bottom width W1 and an opening width W2, then a groove average width $X$ [μm] can be expressed as follows:

$$X=(W1+W2)/2,$$

and if the groove has a depth $Y$ nm, then $X$ and $Y$ satisfy the following relationships:

$$Y \geq 4736X^2 - 4764X + 1239$$

$$X \leq -0.000127Y^2 + 0.018624Y - 0.075043$$

$$X > 0.40.$$

5 Claims, 5 Drawing Sheets

OPTICAL DISC HAVING SPECIFIED TRACK PITCH, PUSH-PULL SIGNAL, AND CROSS-TRACK SIGNAL

BACKGROUND OF THE INVENTION

1. Field of the Invention

The present invention relates to an optical disc on which a land and groove are formed as well as a recording/reproduction method onto/from this optical disc.

2. Description of the Prior Art

As an optical disc for recording and/or reproducing an information signal by laser beam radiation, there are known a magneto-optical disc, a phase change type optical disc, writable optical disc, digital audio disc (so-called compact disc), optical video disc (so-called laser disc), and the like. These optical discs include a transparent substrate made from a resin such as polycarbonate or glass having function films such as a recording layer and reflection layer. Moreover, these optical discs are used like a ROM (read only memory) for carrying out only reproduction such as a compact disc and a laser disc or like RAM (random access memory) capable of reproduction, additional writing, and rewriting.

On these optical discs, a groove is formed as a guide groove for tracking servo. Moreover, in these optical discs, a convex portion between adjacent grooves is called a land. The optical discs can be divided into a groove recording type in which an information signal is recorded in the groove, and a land recording type in which an information signal is recorded on the land.

The phase change type optical disc is used like RAM and need not provide means for generating an external magnetic field. Accordingly, a recording/reproduction apparatus of the phase change type optical disc can be made with a small size and an overwrite of an information signal can easily be carried out, which currently attracts a special attention.

In this phase change type optical disc, a predetermined laser beam is applied to a recording layer so that a material constituting the recording layer of the portion subjected to the laser beam reversibly changes its crystal state and the amorphous state. Recording and reproduction are carried out by detecting a change in reflectivity caused of a difference of optical constants in these states.

More specifically, in this phase change type optical disc, firstly, the recording layer in a crystal state has an initial state. When an information is recorded on this phase change type optical disc, a laser beam having a strong power is applied to a recording layer. The portion subjected to this laser beam increases the temperature above a melting point and after this, the portion is cooled down to an amorphous state.

Moreover, in this phase change type optical disc, when erasing an information signal recorded on the recording layer, a laser beam weaker than the laser beam used for recording is applied so that the recording layer increases its temperature above the crystallization temperature but below the melting point. As a result, the portion subjected to this laser beam becomes a crystal state regardless of the preceding state.

Furthermore, in this phase change type optical disc, when reproducing an information signal recorded on the recording layer, a laser beam is applied to the recording layer. Here, the reflectivity of the laser beam changes depending on whether the portion subjected to the laser beam is in the crystal state or the amorphous state. By detecting this reflectivity, an information signal is reproduced.

Now, there is a DVD-ROM (digital video disc—read only memory) having a diameter identical to that of a compact disc and 4.7 GB recording capacity on one side. In contrast to this, there is a DVD-RAM (digital video disc—random access memory) using a phase change type disc having 2.6 GB capacity on one side. The DVD-ROM and the DVD-RAM have the same specifications for recording and/or reproduction associated with the data transfer rate, the modulation method, and the error correction method.

However, the DVD-RAM using the aforementioned phase change type optical disc employs the land-groove method, whereas the DVD-ROM employs an emboss-pit method like in the compact disc.

For reproducing the DVD-ROM using the groove recording method, a DVD-ROM reproduction apparatus used has a 650 nm wavelength red semiconductor laser and an objective lens of numerical aperture NA=0.6. This DVD-ROM reproduction apparatus cannot reproduce a DVD-RAM using the aforementioned phase change type optical disc.

Thus, the conventional optical disc has a problem that a reproduction-dedicated optical disc reproduction apparatus cannot reproduce a writable optical disc.

Moreover, in the case of the aforementioned DVD-RAM which employs the land-groove recording method, an emboss-pit is formed between the land and the groove. This emboss pit is formed to switch between the land the groove and should be formed with a high accuracy. Accordingly, the aforementioned rewritable optical disc requires a high-accuracy cutting technique in the mastering step. Consequently, such a rewritable optical disc has a difficulty in a production procedure.

SUMMARY OF THE INVENTION

It is therefore and object of the present invention to provide a rewritable optical disc employing the groove recording method and convertible with a DVD-ROM reproduction apparatus, and its recording/reproduction method.

The optical disc according to the present invnention includes a recording layer having a land and a groove to/from which an information signal is recorded/reproduced by a light having a predetermined wavelength, wherein if it is assumed that the groove has a bottom width W1 and an opening width W2, then a groove average width X [$\mu$m] can be expressed as follows:

$$X = (W1+W2)/2$$

and if the groove has a depth Y nm, X and Y satisfy the following relationships:

$$Y \geq 4736X^2 - 4764X + 1239$$

$$X \leq -0.000127Y^2 + 0.018624Y - 0.075043$$

$$X > 0.40.$$

In the optical disc having the aforementioned configuration according to the present invention has a groove having a groove average width X and a groove depth Y which are in a relationship satisfying $Y \geq 4736X^2 - 4764X + 1239$, and accodingly enables to obtain a preferable cross track signal. Moreover, because the groove average width X and the groove depth Y satisfy the relationship of $X \leq -0.000127Y^2 + 0.018624Y - 0.075043$, it is possible to obtain a preferable push-pull signal. Furthermore, because the groove average width X is defined within a range of X>0.40, the groove is wide with respect to the land and it is possible to obtain a preferable cross track signal.

Moreover, the optical disc recording and reproduction method according to the present invention records and reproduces an information signal onto/from an optical disc comprising a recording layer having a land and a groove to/from which an information signal is recorded/reproduced by a light having a predetermined wavelength, wherein if it is assumed that the groove has a bottom width W1 and an opening width W2, then a groove average width X [μm] can be expressed as follows:

$$X=(W1+W2)/2,$$

and if the groove has a depth Y nm, then X and Y satisfy the following relationships:

$$Y \geq 4736X^2-4764X+1239$$

$$X \leq -0.000127Y^2+0.018624Y-0.075043$$

$$X>0.40,$$

the recording and reproduction being carried out by using an optical system having a numerical aperture NA and a wavelength λ [μm] which are in a relationship to each other defined as follows: $0.997 \leq \lambda/NA \leq 1.250$.

In the optical disc recoding and reproducing method having the aforementioned configuration according to the present invention, recording and reproduction are carried out to/from an optical disc having a groove with a groove average width X and groove depth Y which are defined within the aforementioned range. Here, the optical system used for recording and reproducing the optical disc has a numerical aperture NA and a wavelength λ which are in the relationship as follows: $0.997 \leq \lambda/NA \leq 1.250$. Accordingly, with this optical disc recording and reproduction method, it is possible to obtain a preferable cross track signal and push-pull signal.

DETAILED DESCRIPTION OF PREFERRED EMBODIMENTS

Hereinafter, description will be directed to the optical disc and its recording/reproduction method according to a specific embodiment of the present invention.

Figure 1:
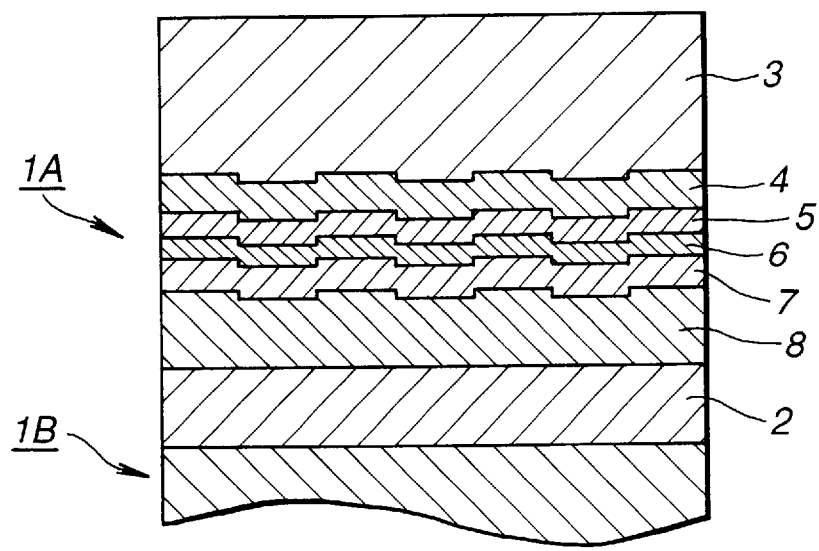
FIG. 1 is a cross sectional view showing an essential portion of an optical disc according to the present invention.

FIG. 1 shows the optical disc 1 according to the present embodiment including a pair of disc bodies 1A and 1B which are bonded together via an adhesive layer 2. Each of the disc bodies 1A and 1B has a diameter of 120 mm and thickness of 0.6 mm. Moreover, each of the disc bodies 1A and 1B includes: a transparent substrate 3 made from polycarbonate or the like; a first dielectric layer 4 formed from $ZnS—SiO_2$ or the like on the substrate 3; a recording layer 5 formed from a GeSbTe material on this first dielectric layer 4; a second dielectric layer 6 formed from $ZnS—SiO_2$ or the lie on the recording layer 5; a reflection layer 7 formed from Al or the like on the second dielectric layer 6; and a protection layer 8 formed from a ultraviolet hardening resin or the like on the reflection layer 7.

Figure 2:
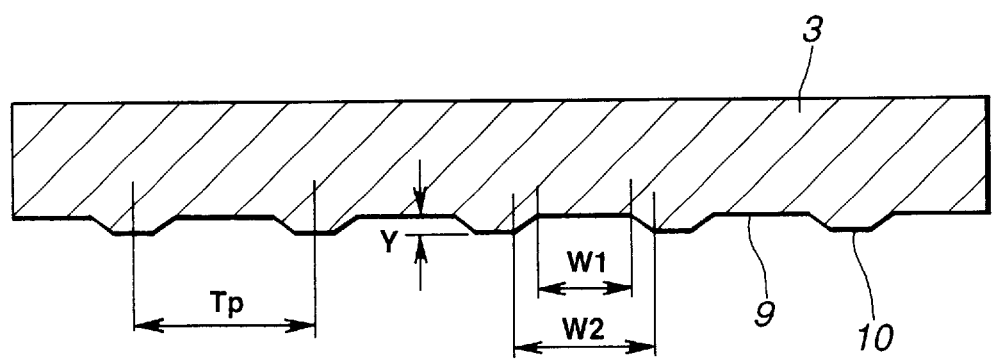
FIG. 2 is a cross sectional view showing an essential portion of a substrate on which a groove and land are formed.

In this optical disc 1, a pair of disc bodies 1A and 1B are bonded together with their protection layers 1A and 1B to oppose each other via an adhesive layer 2. Moreover, in this optical disc 1, as shown in FIG. 2, the substrate 3 has a groove 9 formed in a shape of coaxial circles or in a spiral shape so as to serve as a guide groove for tracking servo, and a land 10 formed between adjacent grooves. In this optical disc 1, on the substrate having the groove 9 and the land 10, there are successively formed a first dielectric layer 4, a recording layer 5, a second dielectric layer 6, and a reflection layer 7. Thus, in this optical disc 1, the convex and concave pattern caused by the groove 9 and the land 10 is formed in the first dielectric layer 4, the recording layer 5, the second dielectric layer 6, and the reflection layer 7.

It should be noted that this substrate 3 is formed by way of injection molding using a stamper prepared through a so-called mastering step. Here, the stamper has a concave and convex pattern corresponding to the groove 9 and the land 10, which forms the groove 9 and the land 10 when the injection molding is carried out.

In this optical disc 1, as shown in FIG. 2, if it is assumed that the groove has a bottom width W1 and an opening width W2, then, a groove average width X [μm] can be expressed as follows.

$$X=(W1+W2)/2$$

Moreover, if the aforementioned groove has a depth Y [μm], X and Y satisfy the following relationships.

$$Y \geq 4736X^2-4764X+1239 \qquad \text{(Equation 1)}$$

$$X \leq -0.000127Y^2+0.018624Y-0.075043 \qquad \text{(Equation 2)}$$

$$X>0.40 \qquad \text{(Equation 3)}$$

These equations (1), (2), and (3) are based on an experimental data which will be detailed below.

In the experiment explained below, a push-pull signal and a cross track signal were obtained with a fixed track pitch of 0.8 μm, while changing the groove average width X and the groove depth Y, and the push-pull signal and the cross track signal were determined by a calculation based on a scalar diffraction theory. It should be noted that the calculation of the push-pull signal and the cross track signal was carried out by using an optical system defined as follows.

Wavelength X=650 nm
Numerical aperture NA=0.6
A/W=(o.83, 0.83)

Figure 3:
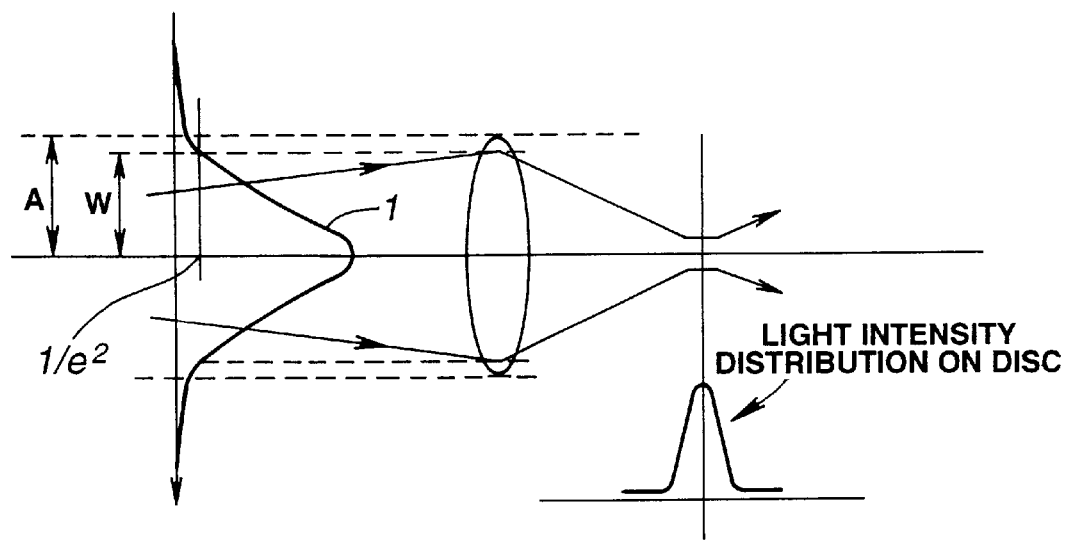
FIG. 3 schematically shows an optical system when a Gaus beam comes into an objective lens.

Here, the A/W is one of the parameters of the optical system which defines a light intensity distribution on a radiation surface. When a laser used can be approximated as a beam indicating a Gausian distribution, the A/W serves as an index how much of the laser is received by an objective lens. More specifically, as shown in FIG. 3, A represents an effective radius of an objective lens, and W represents a beam radius in a range of light intensity equal to or above $1/e^2$ when the light intensity at the beam center is assumed to be 1. Here, it is assumed that Wx is a beam radius in an optical disc radial direction in a beam coming into the optical disc 1; and Wy is a beam radius in an optical disc circumferential direction in a beam coming into the optical disc 1. That is, A/W can be expressed as (A/Wx, A/Wy).

Figure 4:
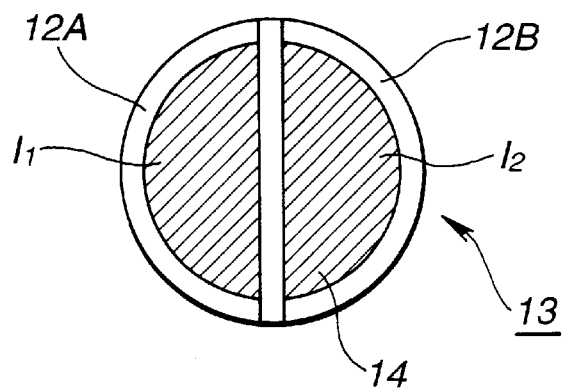
FIG. 4 is a plan view showing an essential portion of two-division light quantity detector for detecting a reflected diffracted light.

In this experiment, the push-pull signal is detected by using a two-division light quantity detector 13 having two photo elements 12A and 12B as shown in FIG. 4. That is, by detecting a light quantity of a reflected diffracted light 14 applied to the photo elements 12A and 12B, the push-pull signal is taken out as a light quantity output difference. In this two-division light quantity detector 13, distribution of the reflected diffracted light 14 is changed according to a relative position between the reflected diffracted light 14 applied and the groove 9. The output difference between the two photo elements 12A and 12B reflects the distribution of the reflected diffracted light 14. Accordingly, by detecting the output difference between the two photo elements 12A and 12B, it is possible to detect a laser spot position error, i.e., a tracking error signal.

Figure 5:
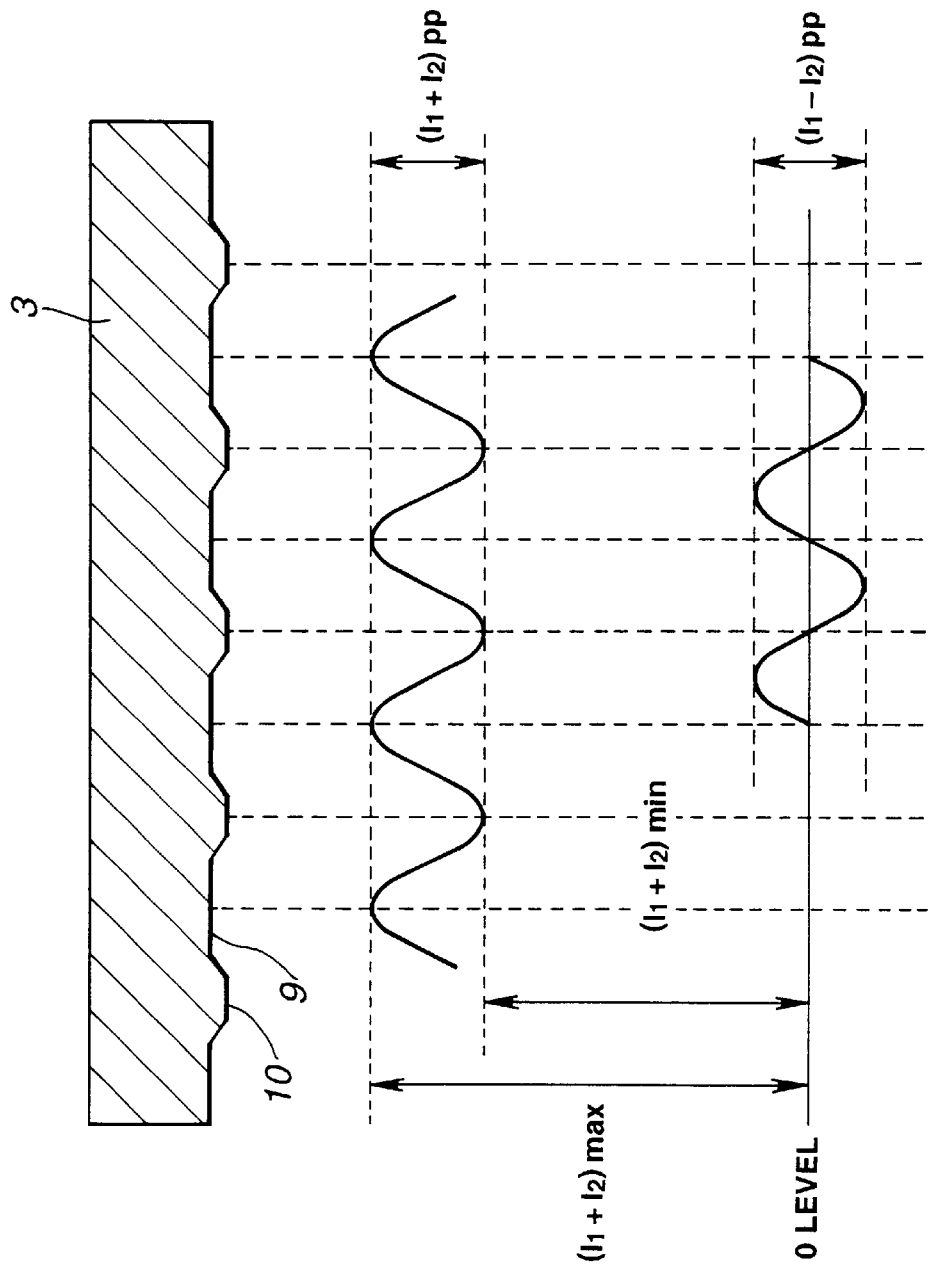
FIG. 5 schematically shows values calculated according to a reflected diffracted light measured by the two-division light quantity detector.

More specifically, if it is assumed that $I_1$ is the output from the photo element 12A and $I_2$ is the output from the photo element 12B, as shown in FIG. 5, $(I_1+I_2)_{pp}$ and $(I_1-I_2)_{pp}$ are detected. According to these values detected, $(I_1+I_2)_{max}$ and $(I_1+I_2)_{min}$ are calculated. From these values, the push-pull signal is determined as follows.

$$(I_1-I_2)_{pp}/\{[(I_1+I_2)_{max}+(I_1+I_2)_{min}]/2\}$$

Figure 6:
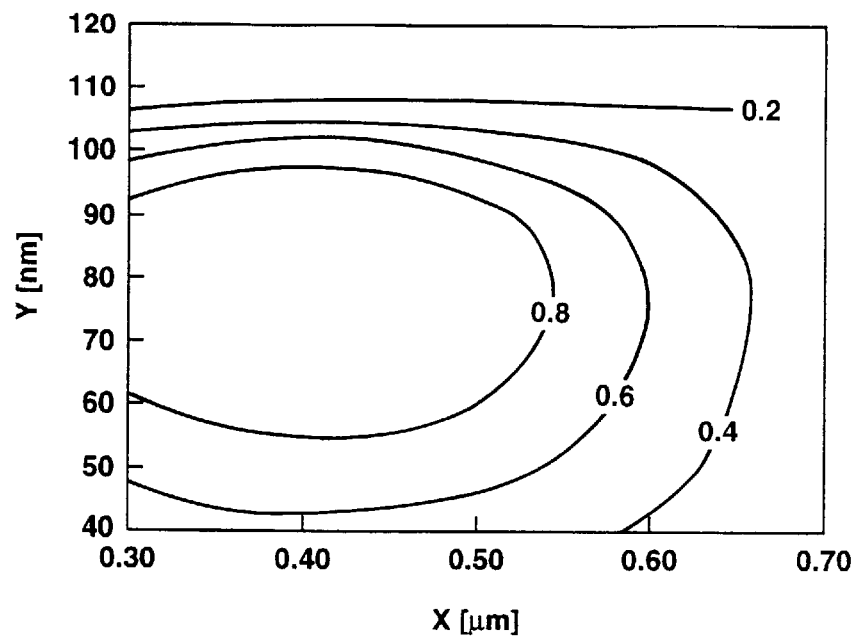
FIG. 6 shows a signal level change characteristic of a push-pull signal when a groove average width X and a groove average depth Y are changed.

Thus, push-pull signal was obtained for the optical disc in which the groove average width X and the groove depth Y are changed. FIG. 6 shows the result. Here, in general, if the push-pull signal has a signal level below 0.6, the tracking servo is very unstable. Accordingly, the push-pull signal should be equal to or above 0.6.

Moreover, in this experiment, the cross track signal was obtained by using the aforementioned two-division light quantity detector 13 used for the tracking servo signal. The laser beam applied was moved in a vertical direction or in an inclined direction to the track direction of the optical disc 1, and the return light was detected to obtain the cross track signal. According to this cross track signal, it is possible to calculate the number of grooves 9 skipped when the laser beam is moved during a so-called seek as well as the laser beam movement speed.

More specifically, by using the $(I_1+I_2)_{pp}$, $(I_1-I_2)_{pp}$, $(I_1+I_2)_{max}$, and $(I_1+I_2)_{min}$ shown in FIG. 5, the cross track signal can be obtained as follows.

$$(I_1+I_2)_{pp}/\{[(I_1+I_2)_{max}+(I_1+I_2)_{min}]/2\}$$

Figure 7:
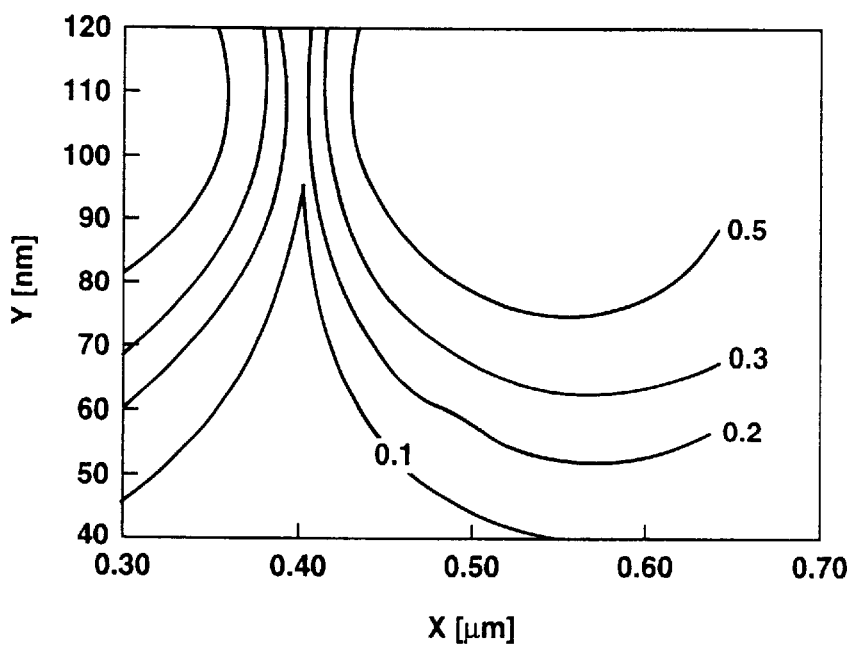
FIG. 7 shows a signal level change characteristic of a cross track signal when a groove average width X and a groove average depth Y are changed.

The cross track signal was obtained in the optical disc in which the groove average width X and the groove depth Y were changed. FIG. 7 shows the result. Here, in general, if the cross track signal has a signal level below 0.1, it is impossible to calculate the number of grooves skipped by movement of the laser beam during a seek operation. Accordingly, the cross track signal should have a signal level equal to or above 0.1

Moreover, as can be understood from FIG. 7, as the groove average width X approaches 0.40 μm, the signal level of the cross track signal approaches 0. In the optical disc having the track pitch of 0.8 μm, if the groove average width X is 0.40 μm, the signal level of the cross track signal is theoretically 0.

Figure 8:
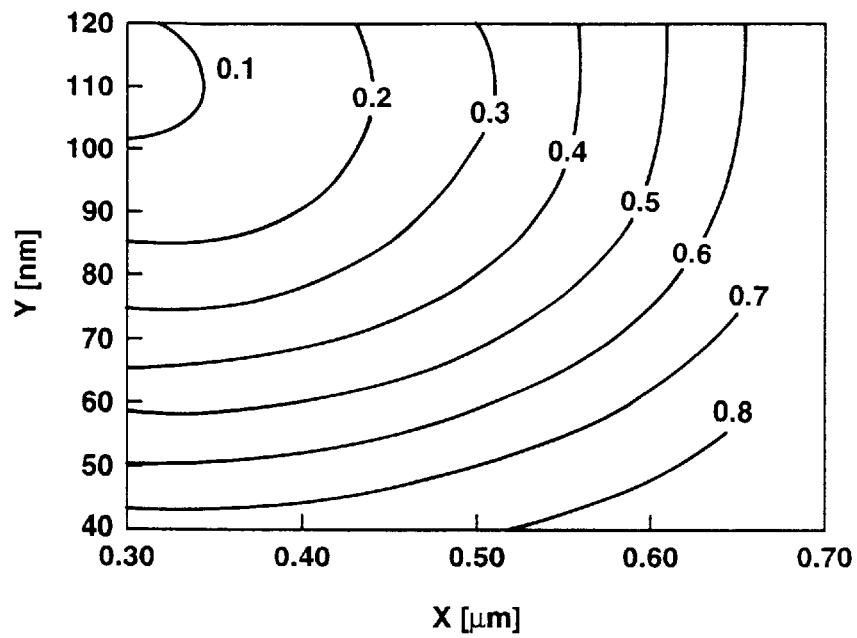
FIG. 8 shows a characteristic in a range where the push-pull signal has a signal level equal to or above 0.6 and the cross track signal has a signal level equal to or above 0.1 and the groove average width X is greater than 0.40.

Thus, the groove average width X and the groove depth Y for which the push-pull signal has a signal level of 0.6 or above and the cross track signal has a signal level of 0.1 or above, as shown in FIG. 8, in a range where the groove average width X is greater than 0.40 and which is surrounded by the curves P and Q.

Here, the curve P represents a boundary for the signal level 0.6 of the push-pull signal, which can be approximated as follows.

$$X=-0.000127Y^2+0.018624Y-0.075043$$

Moreover, the curve Q represents a boundary for the signal level 0.1 of the cross track signal, which can be approximated as follows.

$$Y=4736X^2-4764X+1239$$

According to these approximation equations, the groove 9 and the land 10 are formed on the optical disc 1 so as to satisfy the aforementioned equations (1), (2), and (3), thus enabling to obtain a preferable push-pull signal and cross track signal.

Figure 9:
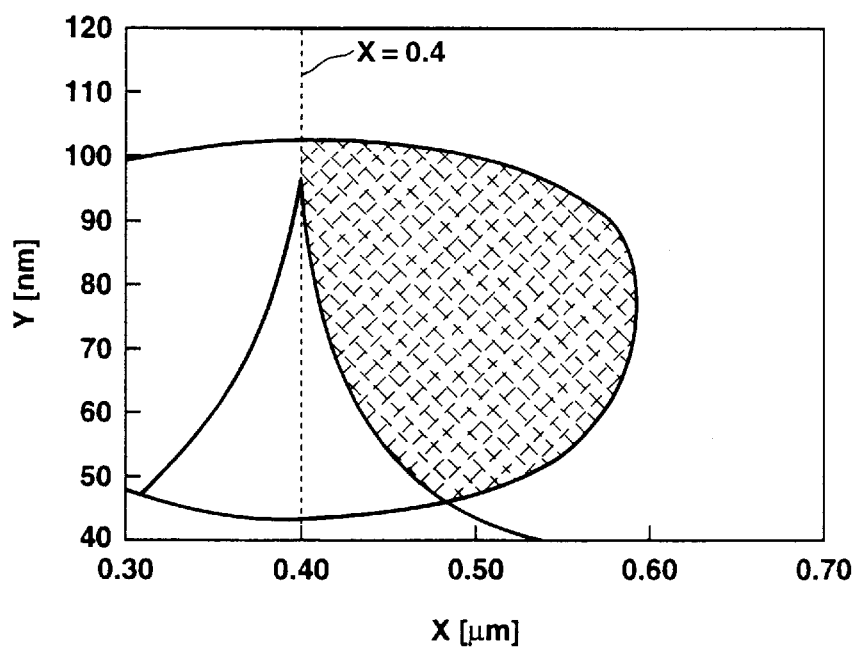
FIG. 9 shows a reflectivity change characteristic when a groove average width X and a groove average depth Y are changed.

Moreover, in this optical disc 1, reflectivity was measured when the groove average width X and the groove depth Y were changed. The reflectivity was calculated as a relative value, assuming as a reference value a reflectivity for a flat area portion) having no convex or concave. FIG. 9 shows the result.

As can be understood from the reflectivity change shown in FIG. 9, as the depth Y of the groove 9 is decreased, the reflectivity is increased. Accordingly, in the optical disc 1, in order to obtain a preferable reflectivity, the groove 9 preferably has a depth Y in the range of Y≦70. In this optical disc 1, by making the depth Y of the groove 9 equal to or below 70 nm, it is possible to obtain a preferable push-pull signal and cross-track signal as well as to obtain a preferable reflectivity. Consequently, in this optical disc 1, when carrying out a recording/reproduction with respect to the groove 9 by using a predetermined optical system, it is possible to obtain a further preferable recording/reproduction characteristic.

Moreover, in the aforementioned optical disc 1, it is preferable that the track pitch (Tp) be 0.8±0.01 μm. In this case, because the groove 9 has an average width X in the range of X>0.4, it is possible to make the interval of the land 10 and the groove 9 appropriate for a high-density recording.

Furthermore, in the aforementioned optical disc 1, it is preferable that recording and reproduction be carried out by an optical system having a relationship between the numerical aperture NA and the wavelength $\lambda$ defined as follows: $0.997 \leq \lambda/NA \leq 1.250$. More specifically, it is preferable to use an optical system having a numerical aperture NA of about 0.6 and a wavelength $\lambda$ of about 650 nm, i.e., $\lambda/NA$ is about 1.083. By using such an optical system, it is possible to record an information signal on the optical disc 1 with a high density.

Moreover, because this optical system is identical to an optical system for reproducing a conventional DVD-ROM, it is possible to use a conventional reproduction apparatus for reproducing the conventional DVD-ROM. That is, this optical disc 1 is compatible with the conventional DVD-ROM.

Furthermore, the aforementioned optical disc 1 can preferably employ the groove recording method. That is, by employing the groove recording method, it is possible to record an information signal on this optical disc with a high density. More specifically, in the optical disc 1 having a diameter of about 120 mm, it is possible to record an information signal of about 3.0 GB on each of the disc bodies 1A and 1B.

Moreover, in this optical disc 1, by employing the groove recording method, there is no need of forming an emboss pit between the groove 9 and the land 10. Accordingly, when producing this optical disc, the cutting in the mastering step is simplified. Consequently, this optical disc 1 can easily be produced.

EXAMPLES

The aforementioned optical disc was actually produced as an example and its characteristic was evaluated. Another optical disc was also produced as a comparative example which is out of the ranges defined by the aforementioned equations (1), (2), and (3), so as to be compared with the Example.

Example 1

Am optical disc A as Example 1 was prepared with a groove average width X of 0.46 $\mu$m and a groove depth Y of 53 nm. This optical disc was prepared by bonding two disc bodies having a diameter of 120 mm via an adhesive layer. Each of the disc bodies includes a polycarbonate substrate having a diameter of 120 mm and a depth of 0.6 mm, on which a first dielectric layer, a recording layer, a second dielectric layer, a reflection layer, and a protection film were successively formed. Here, the recording layer was formed by using GeSbTe with a thickness of 25 nm. Furthermore, the first dielectric layer and the second dielectric layer were formed by using $ZnS-SiO_2$ with a thickness of 120 nm and 15 nm, respectively. Moreover, the protection layer was formed by using an ultraviolet-ray hardening resin.

Example 2

An optical disc B as Example 2 was prepared in the same way as the optical disc A of Example 1 except for that the groove average width X was 0.49 $\mu$m.

Example 3

An optical disc C as Example 3 was prepared in the same way as the optical disc A of Example 1 except for that the groove average width X was 0.52 $\mu$m.

Example 4

An optical disc D as Example 4 was prepared in the same way as the optical disc A of Example 1 except for that the groove average width X was 0.55 $\mu$m.

Comparative Example 1

An optical disc E as Comparative Example 1 was prepared in the same way as the optical disc A of Example 1 except for that the groove average width X was 0.43 $\mu$m.

Evaluation of Characteristics

For these Examples 1 to 4 and Comparative Example 1, the aforementioned optical system was used to measure a push-pull signal and a cross track signal. Here, the recording mark length was set to 0.525 $\mu$m. The measurement results are shown in Table 1.

TABLE 1

| Disc | Groove average width [$\mu$m] | Push-pull signal | Cross track signal | C/N [dB] |
|---|---|---|---|---|
| A | 0.46 | 0.73 | 0.11 | 50.1 |
| B | 0.49 | 0.69 | 0.13 | 50.7 |
| C | 0.52 | 0.64 | 0.17 | 52.3 |
| D | 0.55 | 0.60 | 0.19 | 53.5 |
| E | 0.43 | 0.79 | 0.05 | 48.9 |

As is clear from this table 1, when the groove average width X and the groove depth Y were in the range defined by the aforementioned equations (1), (2), and (3), preferable push-pull signals and cross track signals as well as high C/N values were obtained. In contrast to this, the optical disc of Comparative Example 1 exhibited a low cross track signal and a low C/N value.

As has been detailed above, the optical disc according to the present invention has a groove average width and a groove depth in a predetermined range and enables to obtain a preferable push-pull signal, cross track signal, and reproduction signal. Accordingly, this optical disc enables to further increase a recording density by using the groove recording method.

Moreover, the optical disc recording/reproduction method according to the present invention carries out recording and reproduction onto/from an optical disc having a groove average width and groove depth within a predetermined range, by using a predetermined optical system. This method enables to carry out a high-density recording to such an optical disc.

What is claimed is:

1. A phase change type optical disc comprising a recording layer having a land and a groove to/from which an information signal is recorded/reproduced by a light having a wavelength $\lambda$ in $\mu$m in an optical system having a numerical aperature NA, wherein the relationship $0.997 \leq \lambda/NA \leq 1.250$ is satisfied and wherein said groove has a bottom width W1 and an opening width W2, and a groove average width X in μm expressed as follows:

$X=(W1+W2)/2$ wherein said groove has a depth Y in nm, X and Y satisfy the following relationships:

$Y \geq 4736X^2 - 4764X + 1239$ $X \leq -0.000127Y^2 + 0.018624Y - 0.075043$ $X > 0.40$ wherein the track pitch is in a range of about $0.8 \pm 0.01$ μm and wherein said optical disc has a push-pull signal greater than or equal to 0.6 and a cross track signal greater than or equal to 0.1.

2. An optical disc as claimed in claim 1, wherein said groove depth Y nm is in a range of $Y \leq 70$.

3. An optical disc as claimed in claim 1, wherein an information signal is recorded on said groove.

4. An optical disc as claimed in claim 1, wherein said recording layer is made from a phase change material which is reversibly changed between a crystal state and an amorphous state.

5. An optical disc as claimed in claim 1, said optical disc comprising two disc bodies, each having a diameter of 120 mm and a thickness of 6 mm, which are bonded together.

* * * * *